United States Patent
Paulraj et al.

(10) Patent No.: US 12,332,990 B2
(45) Date of Patent: Jun. 17, 2025

(54) EXTENDED REALITY ASSISTANCE PROVIDED VIA SECURITY PROTOCOL DATA MODEL (SPDM)

(71) Applicant: Dell Products, L.P., Round Rock, TX (US)

(72) Inventors: Deepaganesh Paulraj, Bangalore (IN); Mini Thottunkal Thankappan, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 270 days.

(21) Appl. No.: 18/181,039

(22) Filed: Mar. 9, 2023

(65) Prior Publication Data

US 2024/0303313 A1   Sep. 12, 2024

(51) Int. Cl.
*G06F 21/33* (2013.01)
*G06F 21/83* (2013.01)

(52) U.S. Cl.
CPC .............. *G06F 21/33* (2013.01); *G06F 21/83* (2013.01)

(58) Field of Classification Search
CPC ................................. G06F 21/33; G06F 21/83
See application file for complete search history.

(56) References Cited

U.S. PATENT DOCUMENTS

| | | | |
|---|---|---|---|
| 9,930,051 B1* | 3/2018 | Potlapally | H04L 63/126 |
| 10,972,361 B2 | 4/2021 | Lairsey et al. | |
| 2022/0124118 A1* | 4/2022 | Bangalore Sathyanarayana | H04L 63/1416 |
| 2022/0222325 A1* | 7/2022 | Ponnuru | G06F 13/4221 |
| 2023/0025979 A1* | 1/2023 | Bolen | G06F 21/44 |
| 2023/0118344 A1* | 4/2023 | Bower, III | G06F 9/4401 713/175 |
| 2023/0137484 A1* | 5/2023 | Morgan | G06T 13/20 345/633 |
| 2024/0137363 A1* | 4/2024 | Edwards | H04L 43/50 |
| 2024/0265079 A1* | 8/2024 | Chu | G06F 21/44 |

* cited by examiner

*Primary Examiner* — Mohamed A. Wasel
(74) *Attorney, Agent, or Firm* — Fogarty LLP (57) ABSTRACT

Systems and methods provide an Information Handling System (IHS) comprising one or more host processor modules configured to host pluggable hardware devices and a secure control module configured to host a baseboard management controller. The baseboard management controller obtain an SPDM alias certificate from at least one pluggable hardware device, and retrieve an extended reality content link from the SPDM alias certificate and an error code database from the SPDM alias certificate. The extended reality content link may include one or more of a virtual reality content link, an augmented reality content link, and a mixed reality content link. The extended reality content link comprises a URL or address where virtual, augmented, or mixed reality content associated with the at least one pluggable hardware device is available. The error code database identifies error states associated with the at least one pluggable hardware device.

14 Claims, 3 Drawing Sheets

EXTENDED REALITY ASSISTANCE PROVIDED VIA SECURITY PROTOCOL DATA MODEL (SPDM)

BACKGROUND

The Open Compute Project's (OCP) Datacenter-Modular Hardware System (DC-MHS) sub-project is directed to interoperability between elements of datacenter, edge, and enterprise infrastructure. DC-MHS provides consistent interfaces and form factors among modular building blocks. DC-MHS standardizes a collection of form-factors and supporting ingredients to allow interoperability between different platforms. The Security Protocol and Data Model (SPDM) specification defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities.

Datacenter, edge, and enterprise infrastructure may include various Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical VR/AR/MR device includes an optical system that displays content on a Head-Mounted Device (HMD), such as a heads-up display (HUD), eyeglasses, or the like, or on a portable screen, such as smartphone or tablet.

SUMMARY

Embodiments are directed to embedding extended reality content links, such as VR, AR, or MR content links, and an associated error code database into an SPDM-compliant hardware device. The content links and error code database are provisioned via an SPDM AliasCert model-based alias certificate for self-descriptive assisted servicing. A Baseboard Management Controller (BMC) retrieves the content links and error code database them via SPDM messages.

The BMC retrieves the extended reality content links and the associated error code database from the SPDM-compliant hardware device and downloads extended reality content to facilitate rendering in a BMC Web GUI. The BMD also collaborates with an extended reality assistant application by linking an error code polled from the SPDM-compliant device with associated extended reality content.

The BMC inventories pluggable SPDM-compliant hardware devices via SPDM messages and associates a physical location to each device to facilitate blending extended reality objects (retrieved from the extended reality content link) with the other real world mapped physical devices.

In one embodiment, an Information Handling System (IHS) comprises one or more host processor modules configured to host pluggable hardware devices and a secure control module configured to host a baseboard management controller. The baseboard management controller executes program instructions to validate identities of the pluggable hardware devices using SPDM messages, obtain an SPDM alias certificate from at least one pluggable hardware device, and retrieve an extended reality content link from the SPDM alias certificate. The baseboard management controller also retrieves an error code database from the SPDM alias certificate. The extended reality content link may include one or more of a virtual reality content link, an augmented reality content link, and a mixed reality content link. The extended reality content link comprises a Uniform Resource Locator (URL) or address where virtual, augmented, or mixed reality content associated with the at least one pluggable hardware device is available. The error code database identifies error states associated with the at least one pluggable hardware device.

The baseboard management controller also maps a physical location for the pluggable hardware devices, monitors a health status of the pluggable hardware devices, receives an error code from the at least one pluggable hardware device, and downloads extended reality content associated with the error code from a source identified in the extended reality content link.

The baseboard management controller further comprises a Web graphical user interface (GUI) and displays the extended reality content to a user via the Web GUI. The baseboard management controller may further configure an extended reality assistant application and pass the extended reality content to the extended reality assistant application. The extended reality assistant application operates on a mobile device located remote from the baseboard management controller and displays the extended reality content to a user.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

DETAILED DESCRIPTION

Modular server architectures give cloud service providers a variety of compute choices to meet market and business conditions, offer flexible configurations, and deliver innovative solutions. The Datacenter-Modular Hardware System (DC-MHS) provides interoperability between datacenter, edge, and enterprise infrastructure using consistent interfaces and modular building blocks. DC-MHS standardizes various Host Processor Module (HPM) form factors and provides supporting elements for interoperability of HPMs across various platforms. The HPM is managed by a Datacenter-Secure Control Module (DC-SCM), which is designed to enable a common management and security infrastructure across platforms within a data center. The interface between the DC-SCM and the HPM is referred as the Datacenter-Secure Control Interface (DC-SCI).

The HPM is a traditional CPU-memory device with the Baseboard Management Controllers (BMC) and security functions moved to the DC-SCM. HPMs are not limited to a standard processor architecture and can apply any processor architecture utilizing management and security features.

Figure 1:
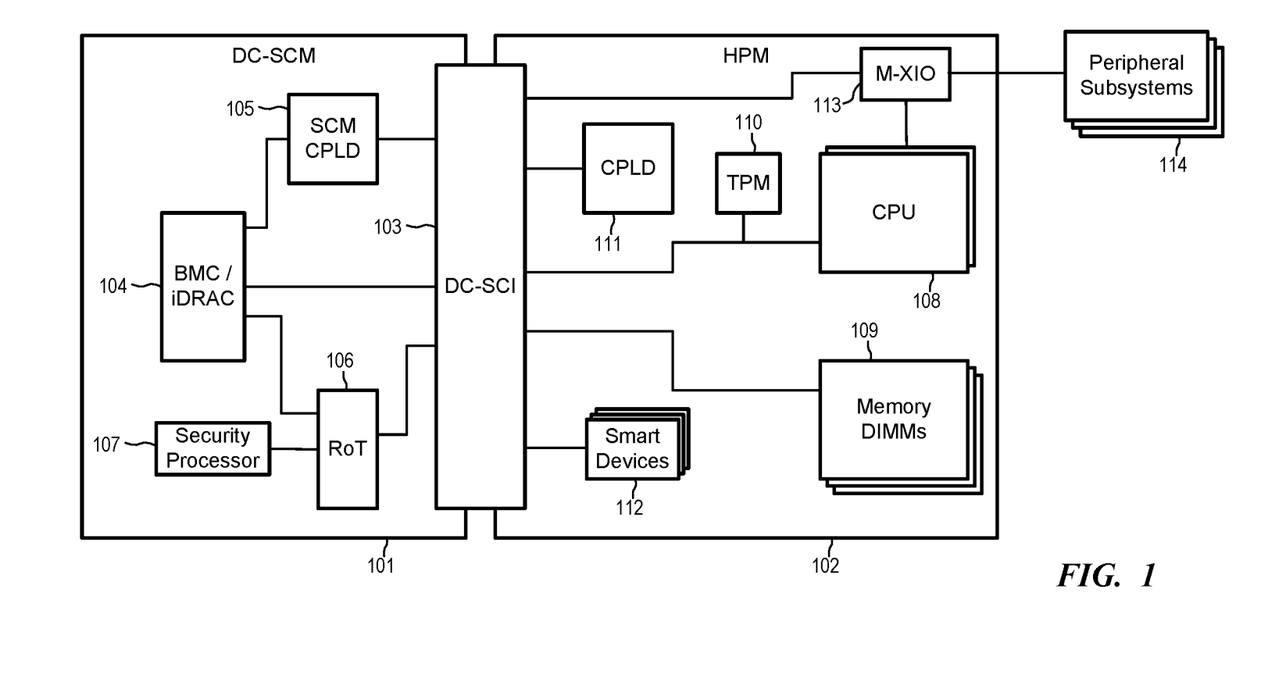
FIG. 1 is a block diagram illustrating multi-node building blocks of a Datacenter-Modular Hardware System.

FIG. 1 is a block diagram illustrating multi-node building blocks of a DC-MHS. DC-SCM 101 is coupled to HPM 102 via DC-SCI 103. The DC-SCM 101 consists of a BMC 104, which is a specialized service processor that monitors the physical state of the server. As a non-limiting example of a BMC 104, the integrated Dell Remote Access Controller (iDRAC) from DELL, INC. is embedded within DELL® PowerEdge servers and provides functionality that helps information technology (IT) administrators at a remote operations centers deploy, update, monitor, and maintain servers with no need for any additional software to be installed.

A complex programmable logic device (DC-SCM CPLD) 105 contains application specific logic and a high-speed and scalable Low-voltage differential signaling Tunneling Protocol & Interface (LTPI). A Roots of Trust (RoT) Security Processor 106 is responsible for attesting the BMC, BIOS, and/or other firmware images on the system. Security Processor 107 stores credentials, licenses, security certificates, and configuration hash values for use in establishing bindings or trust between system components.

HPM 102 represents a general form factor that allows for maximum input/output (I/O) of CPUs 108 in the accessible slots. HPM 102 also includes memory or Dual In-line Memory Modules (DIMMs). The HPM 102 form factor does not require a specific CPU 108 or memory 109 technology. Various HPM 102 form factors support different numbers of CPUs 108 and memory slots 109. The HPM specifications are adapted to allow multiple generations of compute core designs to fit into the form factor specification so that chassis and system designs can be reused as desired.

Trusted Platform Modules (TPM) 110 provide hardware-based, security-related functions for CPUs 108 through integrated cryptographic keys. CPLD 111 supports data exchange between DC-SCM CPLD 105 and HPM 102 using LPTI. In other configurations, HPM 102 may include other hardware components (not shown), such as memory devices, graphics processing units (GPU), peripheral I/O, etc.

HPM 102 may also include one or more smart devices 112, such as a Smart Network Interface Card (NIC), which is a programmable device used to improve data center networking performance, security, features, and flexibility. Other smart devices 112 may include, for example, data processing units (DPU) and infrastructure processing units (IPU).

In the DC-MHS environment an Extensible I/O (M-XIO) source connector 113 enables connectivity to peripheral subsystems 114. M-XIO 113 is a universal hardware API intended to enable the connectivity requirements of multiple different peripheral modules 114 without requiring a connector hardware. M-XIO 113 connector on HPM 102 contain a set of sideband signals that relies on circuitry to serialize/deserialize virtual wires that are tunneled over a 1-wire interface, called the Modular-Peripheral Sideband Tunneling Interface (M-PESTI). Peripheral subsystems 114 may include, for example, EDSFF (Enterprise and Datacenter Standard Form Factor) devices, RAID (Redundant Array of Independent Disks) controllers, PCIe CEM (Card Electro-Mechanical) cards, back planes, and OCP NIC 3.0 adapter cards. Other hardware interfaces and connectors to couple HPM 102 to chassis infrastructure elements and subsystems may follow the Platform Infrastructure Connectivity (M-PIC) specification.

DC-MHS provides a family of specifications to enable interoperability between datacenter and enterprise infrastructure by providing consistent interfaces and form factors among modular building blocks. For example, the Open Compute Project® is developing following HPM specifications. The Modular Hardware System FulL Width Specification (M-FLW), which is an HPM form factor specification that is optimized for using the full width of a standard rack-mountable server. The Modular Hardware System Partial Width Density Optimized Specification (M-DNO), which is an HPM specification that is targeted to partial width, such as half-width or three-quarters-width, form factors.

The DC-SCM design simplifies the deployment of HPMs and increases the efficiency for time to market deployment for new systems. The DC-SCM has a standardized pinout and definition, which provides common boot, monitoring, control, and remote debug for diverse platforms.

DC-SCI 103 supports several PCIe bus options between DC-SCM 101 and HPM 102, including PCIe Gen 2.0 up to PCIe Gen 5.0 x1 interface, SPI interfaces, NC-SI RMII-based transport (RBT) interface, LTPI, eSPI bus, and I2C/I3C bus among others.

DMTF (formerly known as the Distributed Management Task Force) creates open manageability standards including the SPDM standard, which enables authentication, attestation, and key exchange to enable and enhance infrastructure security. SPDM defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities.

Data center administrators require components to establish trust, and to reestablish trust over time, with other components before securely communicating. SPDM provides an authentication mechanism to establish trust between two endpoints. SPDM enables the creation of a session to exchange secured messages between the endpoints. The components may include encompass a number of component types, including PCIe adapters, BMCs, authentication components, CPUs, and components that are attached over I2C or other buses. SPDM enables authentication and secure communication by retrieval of a public key certificate from a component and using a protocol to challenge the component to prove that it is the component whose identity is uniquely described by that certificate. SPDM allows retrieval of a signed measurement payload of mutable components from a component. The measurements may represent a firmware revision, component configuration, the Root of Trust for Measurements, hardware integrity, etc. SPDM provides negotiation of session keys with a component, thereby enabling secured message exchanges with that component.

The Platform Management Components Intercommunication (PMCI) working group of the DMTF prepared the Security Protocol and Data Model (SPDM) Specification (DSP0274) version 1.2.1 dated Jun. 23, 2022, defines messages, data objects, and sequences for performing message exchanges between devices over a variety of transport and physical media. The SPDM Specification sets forth a messaging protocol that defines a request-response messaging model between two endpoints to perform the message exchanges outlined in SPDM message exchanges. The content of the Security Protocol and Data Model (SPDM) Specification (DSP0274) version 1.2.1, including the SPDM message exchanges, are hereby incorporated by reference herein in its entirety.

Figure 2:
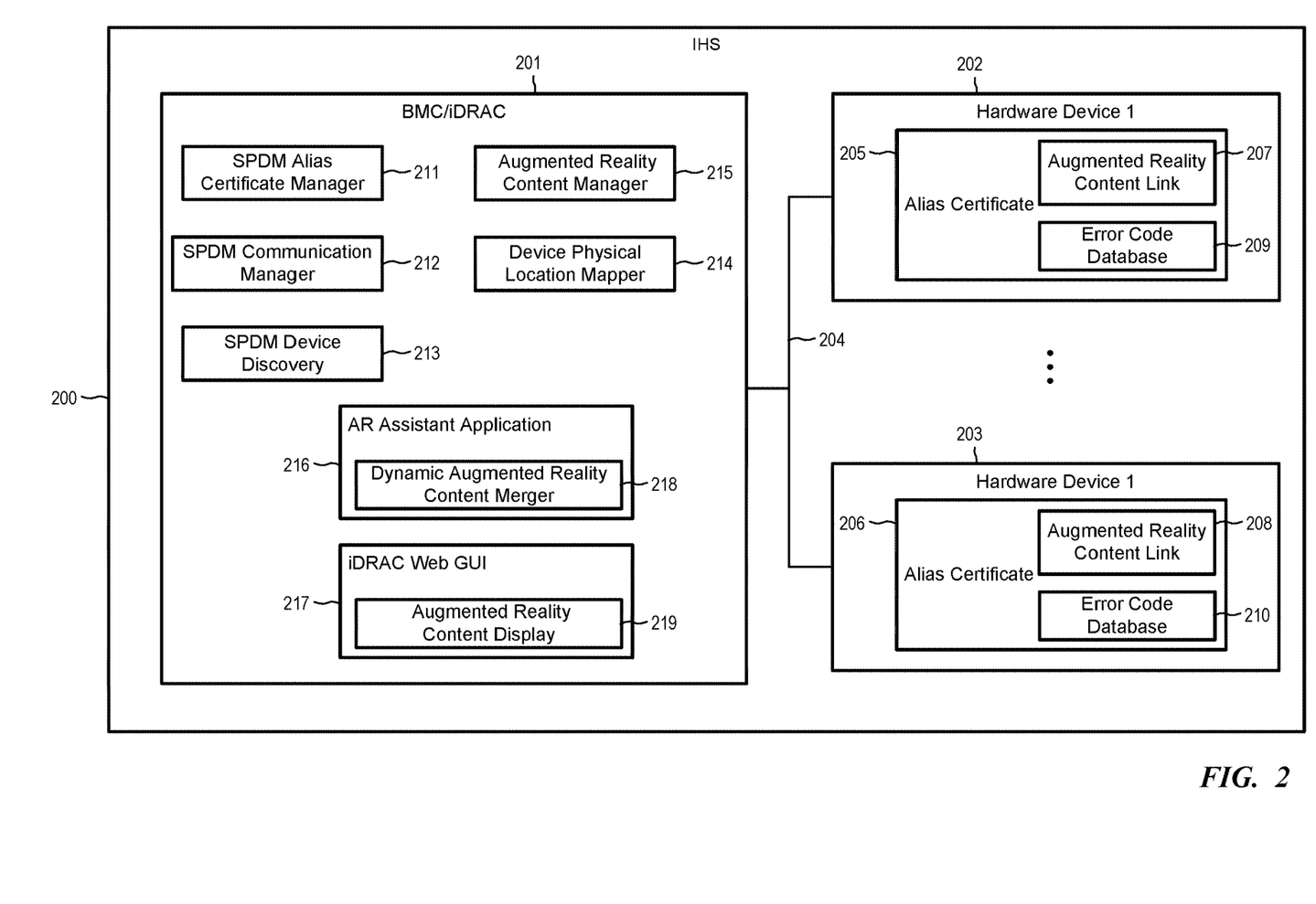
FIG. 2 is a block diagram illustrating elements of a data center system, such as components of a server or an Information Handling System.

FIG. 2 is a block diagram illustrating elements of a data center system 200, which may be components of a server or an Information Handling System (IHS), for example. A BMC, such as iDRAC 201, is in communication with a number of hardware devices 202, 203 via network(s) 204. In one arrangement, hardware devices 202, 203 are components of an HPM, such as CPUs, memory, smart NICs, data processing units (DPU), and/or infrastructure processing units (IPU). Hardware devices 202, 203 may also be peripheral devices, such as EDSFF devices, RAID controllers, PCIe CEM cards, back planes, and/or OCP NIC 3.0 adapter cards that are connected to an HPM. Network(s) 204 may be part of a secure control interface (DC-SCI), for example, and/or may include connectors and interfaces that comply with the M-XIO, M-PESTI, and/or M-PIC specifications. In a modular server architecture, iDRAC 201 and hardware devices 202, 203 may be separate components that do not share a common physical location or motherboard.

Hardware devices 202, 203 are SPDM-capable devices that support identity authentication use a certificate chain containing an ordered list of certificates. A complete certificate chain has (i) a first certificate either signed by a Root Certificate (a certificate that specifies a trust anchor) or is a Root Certificate itself, (ii) subsequent certificates signed by the preceding certificate, and (iii) a final certificate containing a public key used to authenticate the SPDM device. The final certificate is called the leaf certificate. Certificate chains are stored in logical locations called slots. Slots are numbered zero through seven. Each slot is either empty or contains one complete certificate chain. The certificate chains follow either a DeviceCert model or an AliasCert model. When queried, the certificate model type is identified in the SPDM CAPABILITEIS response message. The certificate chain includes a device certificate that binds an asymmetric public/private key pair to a particular device and associates the device with additional metadata. The device certificate includes hardware identity information.

Smart devices 202, 203 in the example of FIG. 2 use the AliasCert model with alias certificates 205, 206 stored in certificate chain slots on each device. Each alias certificate 205, 206 includes, for example, an Augmented Reality (AR) content link 207, 208 and an error code database 209, 210 along with a hardware identity and other information about devices 202, 203. The AR content links 207, 208 may include a URL or other identifier or address where AR content associated with the specific hardware device 202, 203 or related systems may be accessed or downloaded. While AR content is used in the present example, it will be understood that links to other content (e.g., VR and MR content) may also be stored in alias certificates 205, 206. The error code database 209, 210 associate particular system or device errors related to an error code or other problem identifier. For example, error code database 209, 210 may be a list or table that links alphanumeric error codes to a description of a particular error, fault, or failure in a hardware component. In other embodiments, a link, URL, or address for a remote error code database may be stored in the alias certificate 205, 206.

iDRAC 201 runs a number of software programs or daemons in the background. These programs handle various SPDM-related processes such as SPDM alias certificate management 211, SPDM communication management 212, and SPDM device discovery 213, and a mapper 214 to track the physical location of hardware devices 202, 203. Additional applications handle AR-related processes, such as AR content manager 215, AR assistant application 216, and iDRAC Web Graphical User Interface (GUI) 217. The AR assistant application 216 includes a process 218 for merging or overlaying dynamic AR content with a current actual view of hardware 202, 203 or other objects. iDRAC Web GUI 217 provides AR content display 219 to a user interface such as a smartphone display or HMD. In some embodiments, the AR assistant application 216 may run on a mobile device (not shown) located remote from iDRAC 201, such as a smartphone or tablet, wherein the mobile device is configured to receive AR content and display the AR content to a user.

Manufacturers, such as Dell Inc., may offer applications that assist in the repair of their systems using AR technologies. For example, an AR assistant application may be deployed on smartphones or tablets for use in the field or at a customer location during installation and troubleshooting. In a data center environment, a user may access the AR assistant application via an administrator console. The application user selects a product model and/or part that needs to be replaced, such as a type of server with a number of drives. This part may be identified, for example, by a system error code. The application downloads the required AR content and, on the user's screen, blends virtual objects with real-world server components. For example, the AR assistant application may assist a user in replacing parts (i.e., an assisted self-service experience). The AR assistant application gives users flexibility in choosing how their system hardware issues get resolved. The AR assistant application walks the user through the parts replacement process step-by-step on a smartphone or tablet by displaying text instructions while highlighting system components and/or overlaying real-world system components with virtual content. An example system for use with an AR assistant application is disclosed in U.S. Pat. No. 10,972,361, the disclosure of which is hereby incorporated by reference herein.

Due to the flexible and interoperable hardware device selection in the DC-MHS environment, there is a very large number of possible combinations of the hardware devices that can be physically connected within a server chassis. So, it is not feasible to predetermine all of the combinations that might be used at a customer site. When a hardware device fails, the error code database 209, 210 can be used to determine the source of the problem. The AR content link 207, 208 can then be used to download AR contents for use with the AR assistant application to repair the system.

Additionally, in the DC-MHS environment, hardware devices 202, 203 can be sourced from different vendors. The service related the AR contents will be unique to each vendor. So, it is not possible for one manufacturer to maintain or generate the AR content for all hardware.

Instead, the AR content link 207 provides the AR assistant application with a URL or address where required content can be accessed.

The flexible and interoperable hardware device selection available in In the DC-MHS environment allows hardware devices 202, 203 to be connected in different physical locations. So, it is not feasible to generate or render AR contents in a fixed location. The device physical location mapper 214 tracks wherein hardware devices 202, 203 are actually located for use with the AR assistant application.

The AR content links 207, 208 and the associated error database 209, 210 are embedded into pluggable hardware devices 202, 203 via an SPDM AliasCert model-based alias certificate for self-descriptive assisted servicing. The iDRAC 201 retrieves the alias certificates 205, 206 via an SPDM GET_CERTIFICATE message.

The iDRAC 201 retrieves the AR content links 207, 208 and associated error database 209, 210 downloads them when needed to facilitate rendering in the iDRAC web GUI 217 as well as collaborate with an AR assistant application by linking the error code polled from the hardware device with respective AR content.

iDRAC 201 inventories the pluggable hardware devices 202, 203 via SPDM and associates the physical location of each hardware device 202, 203 to facilitate blending the virtual objects (retrieved from the AR content link) with the other real world mapped physical devices.

In one arrangement, pluggable hardware devices embed the AR content links and an error code database in each hardware device itself. Links to VR and MR content may also be embedded in the AR content links. The hardware device generates an SPDM alias certificate based on the current error state of the hardware device with the associated AR content links for self-descriptive assisted servicing. The iDRAC performs discovery of the SPDM-capable hardware devices and retrieves the AR content links and the associated error code database. The iDRAC downloads the AR contents and stores them internally. The iDRAC discovers and inventories all the pluggable hardware devices via SPDM messages and associates a physical location for each hardware device accordingly.

The iDRAC performs hardware device monitoring and polls the health states of hardware devices. If the hardware device is not healthy, then the iDRAC gets the error state of the hardware device, such as by associating a code in an error code database with an error state. The iDRAC associates the error state with the AR contents and renders/displays the content in the iDRAC web GUI along with the other real world mapped physical device static content. Additionally, the iDRAC collaborates with the AR assistant application by configurating the system type and the configuration.

The iDRAC shares the error code and the associated device information, such as the AR content link and physical location to the AR assistant application, which facilitates blending the virtual objects retrieved from the AR content link with the display of real world mapped physical devices.

Figure 3:
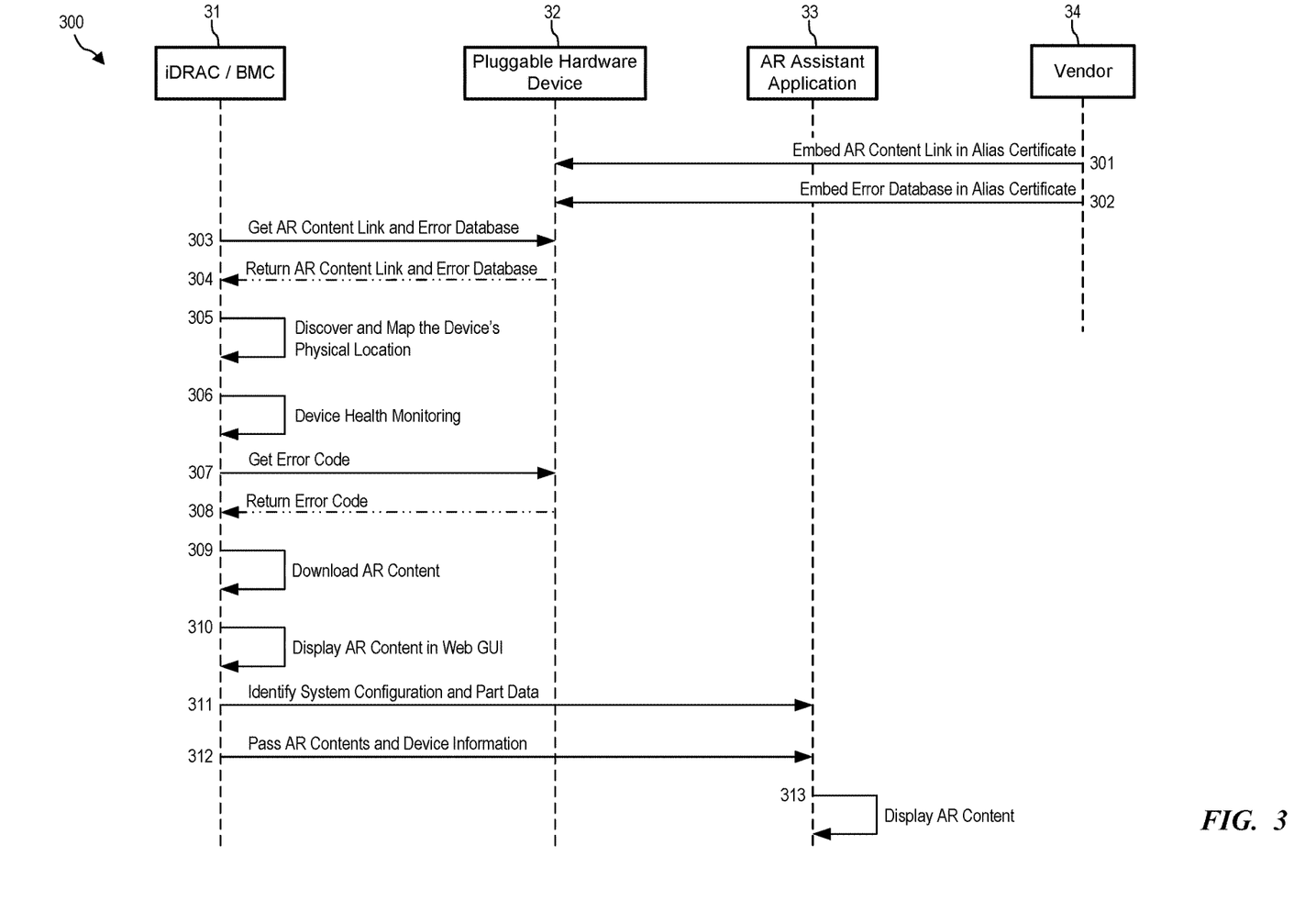
FIG. 3 illustrates a message flow that is exchanged between a Baseboard Management Controller, a hardware device, and augmented reality assistance application for servicing the hardware device.

FIG. 3 illustrates a message flow 300 that is exchanged between an iDRAC 31 and hardware device 32 to provide AR assistance when servicing the hardware device 32. In one embodiment, iDRAC 31 and hardware device 32 are components of a server or IHS in a data center. iDRAC 31 performs the functions of a Baseboard Management Controller, and the hardware device 32 is a pluggable component that has been paired with iDRAC 31. Hardware device 32 may be at a remote physical location from iDRAC 31. During manufacture, a vendor 34 configures the hardware device 32. When the hardware device 32 needs to be serviced, an AR assistant application 33 is used. This message flow 300 may include SPDM messages where iDRAC 31 and Vendor system 34 act as a Requester and hardware device 32 acts as a Responder.

During OEM manufacturing, Vendor system 34 configures hardware device 32 with eight slots for holding SPDM certificate chains. Hardware device 32 implements the SPDM AliasCert model. In step 301, the Vendor system 34 embeds an AR content link in an alias certificate. The AR content link identifies an address, port, or location where augmented, virtual, or mixed reality content associated with the hardware device 32 is available. In step 302, the Vendor system 34 embeds an error code database in an alias certificate. When manufacturing is complete, hardware device 32 is deployed at a customer location and associated with iDRAC 31.

In step 303, iDRAC 31 sends a request to hardware device 32 to provide device certificates. This may be an SPDM GET_CERTIFICATE message, for example, in which iDRAC 31 requests that hardware device 32 provide a certificate chain from a specified slot number. In step 304, hardware device 32 return its hardware identity certificate. This may be in an SPDM CERTIFICATE response message that includes an id-DMTF-hardware-identity OID along with metadata. The alias certificate(s) exchanged in steps 303, 304 include one or more AR content links and an error code database for hardware device 32. iDRAC 31 may exchange additional SPDM request/response messages (not shown) to determine capabilities of hardware device 32. These may be SPDM GET_CAPABILITIES request messages and SPDM CAPABILITIES response messages, for example.

In step 305, iDRAC 31 discovers and inventories all SPDM-capable hardware, including device 32, and associates a physical location for each. In step 306, during normal operation, iDRAC 31 monitors the health of the pluggable hardware, including device 32.

In step 307, if hardware device 32 is not healthy, iDRAC 31 requests an error code. Hardware device 32 returns an error code in step 308. The error code may be used to determine an error state for hardware device 32 from the error database retrieved in step 304.

In step 309, iDRAC 31 associates the error state with relevant AR contents and downloads that content from the AR content link retrieved in step 303. In step 310, iDRAC 31 renders the AR content using an iDRAC web GUI and displays AR content along with real world mapped static content, such as an overlay of AR/VR content on top of an image of the physical hardware device 32.

In step 311, iDRAC 31 collaborates with AR assistant application 33 by identifying a system type and hardware device 32 configuration. AR assistant application 33 may be running on a user smartphone or tablet, for example. In step 312, iDRAC 31 shares the error code and the associated device information, such as the AR content link, AR content, and/or physical location of hardware device 32 to the AR assistant application 33.

In step 313, the AR assistant application 33 displays AR content to a user. The AR assistant application 33 facilitate blending a display of virtual objects that are retrieved from the AR content link with the real world physical devices. For example, the AR assistant application 33 may overlay AR content (e.g., images of replacement components, highlights, animation) on top of actual images of hardware device 32. The AR content may demonstrate to a user how to install, remove, repair, replace, connect, disconnect, attach, detach, or otherwise move actual or virtual components by overlaying images of recommended actions on top of the display of the actual hardware device 32.

As noted above, in various embodiments, the extended reality (XR) content may be VR, AR, or MR. VR content relates to an artificial digital environment that completely replaces the real-world environment. Users are submerged in a digitally created VR world where hearing, vision, and sometimes other senses are created by a digital device and delivered to the person via an HMD in most cases. AR content is layered on top of the real-world environment. AR content can be used to enrich the real-world experience of the user. For AR users do not necessarily need an HMD or specialized equipment. AR can be delivered through smart glasses, headsets, and portable devices such as smartphones and tablets. MR content is anchored to the real world and digital objects created in the real world are capable of real-time interactions with the environment and the user. MR users may require holographic or immersive devices to interact with the MR content.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

In one embodiment, an IHS comprises one or more host processor modules configured to host pluggable hardware devices and a secure control module configured to host a baseboard management controller. The baseboard management controller comprises at least one processor coupled to at least one memory. The at least one memory having program instructions stored thereon that, upon execution by the at least one processor, cause the baseboard management controller to validate identities of the pluggable hardware devices using SPDM messages, obtain an SPDM alias certificate from at least one pluggable hardware device, and retrieve an extended reality content link from the SPDM alias certificate. The program instructions further cause the baseboard management controller to retrieve an error code database from the SPDM alias certificate. The program instructions further cause the baseboard management controller to map a physical location for the pluggable hardware devices. The program instructions further cause the baseboard management controller to monitor a health status of the pluggable hardware devices, receive an error code from the at least one pluggable hardware device, and download extended reality content associated with the error code from a source identified in the extended reality content link.

The extended reality content link includes one or more of a virtual reality content link, an augmented reality content link, and a mixed reality content link. The extended reality content link comprises a URL or address where virtual, augmented, or mixed reality content associated with the at least one pluggable hardware device is available. The error code database identifies error states associated with the at least one pluggable hardware device.

The baseboard management controller further comprises a Web GUI. The program instructions further cause the baseboard management controller to display the extended reality content to a user via the Web GUI.

The program instructions further cause the baseboard management controller to configure an extended reality assistant application and pass the extended reality content to the extended reality assistant application. The extended reality assistant application is operating on a mobile device located remote from the baseboard management controller. The extended reality assistant application is configured to display the extended reality content to a user.

In another arrangement, an IHS comprises a BMC having at least one processor coupled to at least one memory. The at least one memory has program instructions stored thereon that, upon execution by the at least one processor, cause the BMC to identify one or more pluggable hardware devices using SPDM messages, obtain an SPDM alias certificate from at least one pluggable hardware device, retrieve an AR content link from the SPDM alias certificate, and retrieve an error code database from the SPDM alias certificate. The AR content link comprises a URL or address identifying a source for AR content associated with the at least one pluggable hardware device. The error code database identifies error states associated with the at least one pluggable hardware device. The program instructions further cause the BMC to map a physical location for the pluggable hardware devices. The program instructions further cause the BMC to monitor a health status of the pluggable hardware devices, receive an error code from the at least one pluggable hardware device, and download AR content associated with the error code from a source identified in the AR content link. The program instructions further cause the BMC to display the AR content to a user via a Web GUI. The program instructions further cause the BMC to configure an AR assistant application and pass the AR content to the AR assistant application, wherein the AR assistant application is configured to display the AR content to a user.

In a further embodiment, an IHS comprises a baseboard management controller comprising at least one processor coupled to at least one memory. The at least one memory having program instructions stored thereon that, upon execution by the at least one processor, cause the baseboard management controller to obtain an SPDM alias certificate from an SPDM-compliant hardware device using an SPDM GET_CERTIFICATE request message, extract an AR content link from the SPDM alias certificate, and extract an error code database from the SPDM alias certificate. The program instructions further cause the baseboard management controller to map a physical location for the SPDM-compliant hardware device, monitor a health status of the SPDM-compliant hardware device, receive an error code from the SPDM-compliant hardware device, and download AR content associated with the error code from a source identified in the AR content link. The program instructions further cause the baseboard management controller to display the AR content to a user via a Web GUI and pass the AR content to an AR assistant application, wherein the AR assistant application is configured to display the AR content to a user on a device remote from the baseboard management controller.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An Information Handling System (IHS), comprising:
one or more host processor modules configured to host pluggable hardware devices; and
a secure control module configured to host a baseboard management controller;
wherein the baseboard management controller comprises at least one processor coupled to at least one memory, the at least one memory having program instructions stored thereon that, upon execution by the at least one processor, cause the baseboard management controller to:
validate identities of the pluggable hardware devices using Security Protocol and Data Model (SPDM) messages;
obtain an SPDM alias certificate from at least one pluggable hardware device;
retrieve an extended reality content link from the SPDM alias certificate;
monitor a health status of the pluggable hardware devices;
receive an error code from the at least one pluggable hardware device;
download extended reality content associated with the error code from a source identified in an extended reality content link;
configure an extended reality assistant application; and
pass the extended reality content to the extended reality assistant application.

2. The IHS of claim 1, wherein the program instructions further cause the baseboard management controller to:
retrieve an error code database from the SPDM alias certificate.

3. The IHS of claim 1, wherein the extended reality content link includes one or more of a virtual reality content link, an augmented reality content link, and a mixed reality content link.

4. The IHS of claim 1, wherein the extended reality content link comprises a Uniform Resource Locator (URL) or address where virtual, augmented, or mixed reality content associated with the at least one pluggable hardware device is available.

5. The IHS of claim 2, wherein the error code database identifies error states associated with the at least one pluggable hardware device.

6. The IHS of claim 1, wherein the program instructions further cause the baseboard management controller to:
map a physical location for the pluggable hardware devices.

7. The IHS of claim 1, wherein the baseboard management controller further comprises a Web graphical user interface (GUI); and
wherein the program instructions further cause the baseboard management controller to:
display the extended reality content to a user via the Web GUI.

8. The IHS of claim 1, wherein the extended reality assistant application is operating on a mobile device located remote from the baseboard management controller; and
wherein the extended reality assistant application is configured to display the extended reality content to a user.

9. An Information Handling System (IHS) comprising:
a baseboard management controller (BMC) comprising at least one processor coupled to at least one memory, the at least one memory having program instructions stored thereon that, upon execution by the at least one processor, cause the BMC to:
identify one or more pluggable hardware devices using Security Protocol and Data Model (SPDM) messages;
obtain an SPDM alias certificate from at least one pluggable hardware device;
retrieve an augmented reality (AR) content link from the SPDM alias certificate;
retrieve an error code database from the SPDM alias certificate;
monitor a health status of the one or more pluggable hardware devices;
receive an error code from the at least one pluggable hardware device;
download AR content associated with the error code from a source identified in the AR content link;
configure an AR assistant application; and
pass the AR content to the AR assistant application, wherein the AR assistant application is configured to display the AR content to a user.

10. The IHS of claim 9, wherein the AR content link comprises a Uniform Resource Locator (URL) or address identifying a source for AR content associated with the at least one pluggable hardware device.

11. The IHS of claim 9, wherein the error code database identifies error states associated with the at least one pluggable hardware device.

12. The IHS of claim 9, wherein the program instructions further cause the BMC to:
map a physical location for the pluggable hardware devices.

13. The IHS of claim 9, wherein the program instructions further cause the BMC to:
display the AR content to a user via a Web graphical user interface (GUI).

14. An Information Handling System (IHS) comprising:
a baseboard management controller comprising at least one processor coupled to at least one memory, the at least one memory having program instructions stored thereon that, upon execution by the at least one processor, cause the baseboard management controller to:
obtain a Security Protocol and Data Model (SPDM) alias certificate from an SPDM-compliant hardware device using an SPDM GET_CERTIFICATE request message;
extract an augmented reality (AR) content link from the SPDM alias certificate; and
extract an error code database from the SPDM alias certificate;

map a physical location for the SPDM-compliant hardware device;
monitor a health status of the SPDM-compliant hardware device;
receive an error code from the SPDM-compliant hardware device;
download AR content associated with the error code from a source identified in the AR content link;
display the AR content to a user via a Web graphical user interface (GUI); and
pass the AR content to an AR assistant application, wherein the AR assistant application is configured to display the AR content to a user on a device remote from the baseboard management controller.

\* \* \* \* \*